United States Patent
Philipp et al.

(10) Patent No.: US 11,689,820 B2
(45) Date of Patent: Jun. 27, 2023

(54) COMBINING GRAYSCALE SCANNED IMAGES WITH COLOR IMAGE TO CREATE HIGH-RESOLUTION OVERLAY IMAGES IN VEHICLES

(71) Applicant: GM GLOBAL TECHNOLOGY OPERATIONS LLC, Detroit, MI (US)

(72) Inventors: Tzvi Philipp, Bet Shemesh (IL); Michael Slutsky, Kfar Saba (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 256 days.

(21) Appl. No.: 17/142,672

(22) Filed: Jan. 6, 2021

(65) Prior Publication Data

US 2022/0217272 A1 Jul. 7, 2022

(51) Int. Cl.

| | |
|---|---|
| *H04N 23/951* | (2023.01) |
| *G06T 5/00* | (2006.01) |
| *G06T 5/50* | (2006.01) |
| *G06T 3/40* | (2006.01) |
| *G06N 3/08* | (2023.01) |
| *B60R 11/04* | (2006.01) |
| *G06N 3/045* | (2023.01) |
| *H04N 23/90* | (2023.01) |
| *H04N 23/617* | (2023.01) |
| *H04N 23/12* | (2023.01) |

(52) U.S. Cl.
CPC ........... *H04N 23/951* (2023.01); *B60R 11/04* (2013.01); *G06N 3/045* (2023.01); *G06N 3/08* (2013.01); *G06T 3/4046* (2013.01); *G06T 3/4053* (2013.01); *G06T 5/006* (2013.01); *G06T 5/50* (2013.01); *H04N 23/617* (2023.01); *H04N 23/90* (2023.01); *B60R 2300/105* (2013.01); *B60R 2300/303* (2013.01); *G06T 2207/10024* (2013.01); *G06T 2207/20081* (2013.01); *G06T 2207/20084* (2013.01); *G06T 2207/30252* (2013.01); *H04N 23/12* (2023.01)

(58) Field of Classification Search
None
See application file for complete search history.

(56) References Cited

U.S. PATENT DOCUMENTS

| | | | |
|---|---|---|---|
| 9,219,860 B1 * | 12/2015 | Kozko | H04N 5/247 |
| 2018/0376084 A1 * | 12/2018 | Ulaganathan | H04N 5/2258 |
| 2021/0209801 A1 * | 7/2021 | Kim | H04N 5/225 |
| 2022/0058769 A1 * | 2/2022 | Cho | H04N 9/045 |

* cited by examiner

*Primary Examiner* — Quan Pham
(74) *Attorney, Agent, or Firm* — Cantor Colburn LLP

(57) ABSTRACT

A vehicle control system for automated driver-assistance includes a low-resolution color camera that captures a color image of a field of view at a first resolution. The vehicle control system further includes a high-resolution scanning camera that captures a plurality of grayscale images, each of the grayscale images at a second resolution. The second resolution is higher than the first resolution. The grayscale images encompass the same field of view as the color image. The vehicle control system further includes one or more processors that perform a method that includes overlaying the plurality of grayscale images over the color image. The method further includes correcting motion distortion of one or more objects in the grayscale images. The method further includes generating a high-resolution output image by assigning color values to one or more pixels in the grayscale images based on the color image using a trained neural network.

20 Claims, 7 Drawing Sheets

COMBINING GRAYSCALE SCANNED IMAGES WITH COLOR IMAGE TO CREATE HIGH-RESOLUTION OVERLAY IMAGES IN VEHICLES

INTRODUCTION

The subject disclosure relates to controlling vehicles and particularly combining grayscale scanned images with a color image to create high-resolution overlay images to perform such control.

Imaging sensor systems are often employed in mobile platforms such as vehicles and other transportation devices to provide a visual image of areas surrounding the devices. Mobile platforms encounter other moving and non-moving objects as they journey through space and time. Many mobile platforms include various types of imaging sensors to track these moving and non-moving objects. While it is advantageous to image over a wide field of view, it generally entails sacrificing resolution for the size of the field of view. In other words, a trade-off exists between the size of the field of view and angular resolution.

It is desirable to provide improved imaging sensor systems that improve the characteristics of the captured images being used for controlling the mobile platforms.

SUMMARY

In one exemplary embodiment, a vehicle control system for automated driver-assistance includes a low-resolution color camera that captures a color image of a field of view at a first resolution. The vehicle control system further includes a high-resolution scanning camera that captures a plurality of grayscale images, each of the grayscale images at a second resolution, wherein the second resolution is higher than the first resolution, and the plurality of grayscale images encompass the same field of view as the color image. The vehicle control system further includes one or more processors that perform a method that includes overlaying the plurality of grayscale images over the color image. The method further includes correcting motion distortion of one or more objects detected in the grayscale images. The method further includes generating a high-resolution output image by assigning color values to one or more pixels in the grayscale images based on the color image using a trained neural network.

In one or more embodiments, the trained neural network is trained using supervised training using a reference high-resolution color image.

In one or more embodiments, the trained neural network includes a first neural network that generates a first set of color values based on the color image, and a second neural network that generates a second set of color values based on the grayscale images, and further, generates the high-resolution output image with pixels based on the first set of color values and the second set of color values. In one or more embodiments, output from one or more layers of the first neural network is provided to corresponding layers of the second neural network for determining the color values.

In one or more embodiments, the trained neural network is trained using self-supervised training. In one or more embodiments, the trained neural network is trained to generate the high-resolution output image by transforming one or more regions of the color image with a lower resolution to match corresponding regions in the grayscale images with a higher resolution. In one or more embodiments, the trained neural network is further trained to determine the color values for the pixels in the high-resolution output image by upscaling color values of pixels in the color image with a lower resolution.

In another exemplary embodiment a computer-implemented method for automated driver-assistance by a vehicle control system includes capturing, by a low-resolution color camera, a color image of a field of view at a first resolution. The method further includes capturing, by a high-resolution scanning camera, a plurality of grayscale images, each of the grayscale images is of a second resolution, wherein the second resolution is higher than the first resolution, and the plurality of grayscale images encompass the same field of view as the color image. The method further includes generating a high-resolution output image, by one or more processors by performing a method that includes overlaying the plurality of grayscale images over the color image, and correcting motion distortion of one or more objects detected in the grayscale images. Generating the high-resolution output image further includes generating the high-resolution output image by assigning color values to one or more pixels in the grayscale images based on the color image using a trained neural network.

In yet another exemplary embodiment a computer program product comprising non-transitory computer-readable media comprising computer-executable instructions, which when executed by one or more processors cause the one or more processors to perform a method. The method includes capturing, by a low-resolution color camera, a color image of a field of view at a first resolution. The method further includes capturing, by a high-resolution scanning camera, a plurality of grayscale images, each of the grayscale images is of a second resolution, wherein the second resolution is higher than the first resolution, and the plurality of grayscale images encompass the same field of view as the color image. The method further includes generating a high-resolution output image by performing a method that includes overlaying the plurality of grayscale images over the color image, and correcting motion distortion of one or more objects detected in the grayscale images. Generating the high-resolution output image further includes generating the high-resolution output image by assigning color values to one or more pixels in the grayscale images based on the color image using a trained neural network.

The above features and advantages and other features and advantages of the disclosure are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings in which.

DETAILED DESCRIPTION

Figure 1:
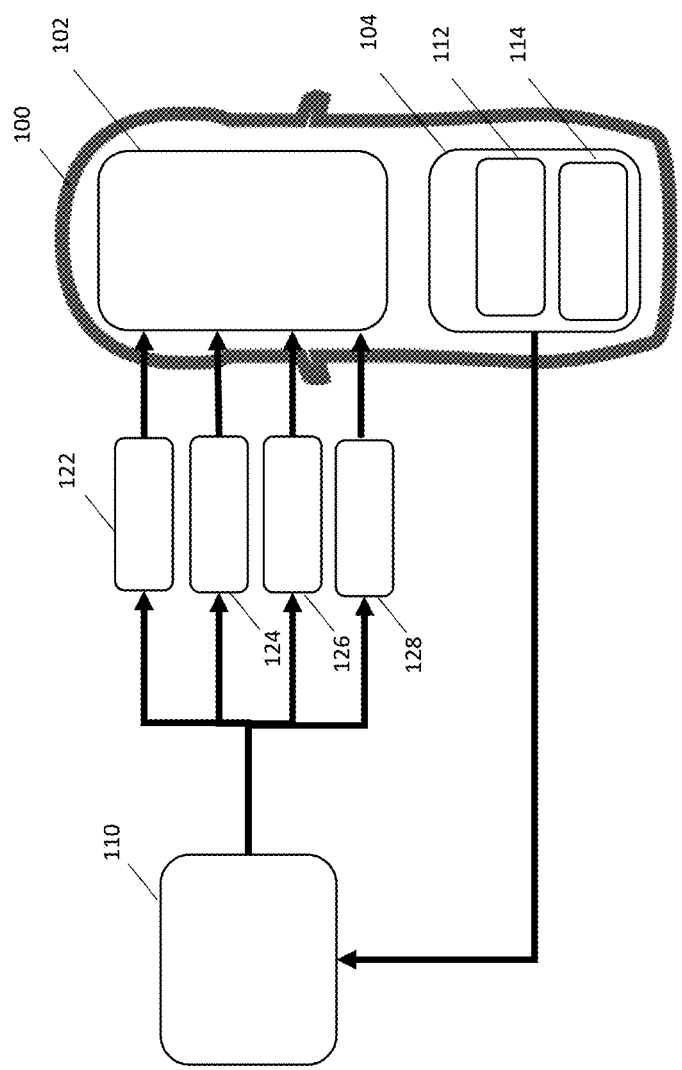
FIG. 1 is a block diagram of an imaging system for a vehicle according to one or more embodiments.

The following description is merely exemplary in nature and is not intended to limit the present disclosure, its application, or uses. It should be understood that throughout the drawings, corresponding reference numerals indicate like or corresponding parts and features. As used herein, the term "module" refers to processing circuitry that may include an application-specific integrated circuit (ASIC), an electronic circuit, a processor (shared, dedicated, or group) and memory that executes one or more software or firmware programs, a combinational logic circuit, and/or other suitable components that provide the described functionality.

In accordance with an exemplary embodiment, a method is described to combine grayscale scanned images with a color image to create a high-resolution overlay image. Advanced driver-assistance systems (ADAS) are electronic systems that assist drivers in driving and parking functions associated with a vehicle. For example, ADAS can include image processing algorithms and neural networks developed to help distinguish critical objects in a field of view (FOV) of the vehicle, (e.g., traffic lights, warning signals, etc.) ADAS use color images generated over a wide FOV at high resolution, with low distortion.

Capturing such images in real-time and at a low cost is a technical challenge. Typically, such constraints contradict existing physical limitations in imaging systems, thereby causing manufacturers of such imaging systems, ADAS, vehicles, etc., to make compromises on at least one of the requirements to achieve a cost-effective solution. For example, wide FOV cameras with low resolution can be created at a low cost. However, the image suffers from distortion (e.g., fish-eye distortion) that can make objects in the FOV indistinguishable from each other. In other scenarios, the ADAS require narrow field-of-view cameras with low distortion. However, to meet these requirements of the ADAS, several different cameras have to be used to provide ample coverage of the viewing region. Using multiple cameras can be cost-prohibitive, and further, resource-intensive.

Because of these constraints, existing technical solutions used for ADAS use image sensors that have more pixels. For example, vehicles that presently use 2 million pixels sensors are being replaced with 5, 8, and 12 million pixels sensors. This replacement comes at the cost of more expensive sensors, larger amounts of data to process, and larger demands on the on-board communication/processors to deal with the larger amounts of data. The larger sensors also drive up the cost of the optical components used for high-resolution sensors because the larger image sensor format increases the size and complexity of the optics and, in turn, the cost.

Embodiments of the technical solutions described herein address such technical challenges by using a coaligned, either co-axially or offset spatially, low-resolution color camera with a scanning camera. The same sensor type (e.g., pixels size, number of pixels, frame rate) can be used for both cameras. In one or more embodiments, a wide FOV camera is chosen for the high-resolution camera so that the total FOV of the high-resolution camera is the same (or of the same size) as the low-resolution color camera but generates grayscale images. In other embodiments, a low-resolution sensor (e.g., 2 million pixels) is used with the scanning camera to generate a high-resolution, low-distortion image over a large FOV (90 degrees up to 120 degrees), the FOV being the same as the low-resolution color camera. The scanning camera's instantaneous FOV (iFOV) is a fraction of the total scanned FOV of the fixed FOV of the color camera, which is based upon the imaging system's resolution requirements, the scanning mechanism, and desired range.

In embodiments of the technical solutions described herein, a color image captured by a static camera is used to overlay the color scene on grayscale images captured by the scanning camera. The color images can be used to identify potential objects in the FOV to allow for detection/identification under the higher resolution of the scanning camera system.

The scanning process can render objects in motion during the scanning process distorted due to the object's motion. Such distortions can be reduced or removed by correlating the detected object to a corresponding undistorted image in the static color image. For example, object smear, object scaling (magnification), and distortion can be corrected in this manner. Objects moving across the scanned FOV in multiple scans by the scanning camera can cause the objects to be rendered with motion-related artifacts. However, in one or more embodiments, the color camera reference images are used to correct for such scanning artifacts. For example, the color images can be used to correct the relative motion of objects identified in the scanning camera images.

Turning now to FIG. 1, a block diagram of an imaging system for a vehicle is depicted. A vehicle 100 includes a vehicle controller 110 that performs or controls operations to provide ADAS functionality. The controller 110 can include one or more processors and memory devices. The controller 110 can execute computer-executable instructions to perform one or more methods, such as those described herein.

The controller 110 can send one or more control signals/commands to one or more vehicle operation modules such as steering 122, powertrain 124, brakes 126, radar 128, etc. It is understood that the list of vehicle operation modules is not exhaustive, and any other type of vehicle operation module can receive the control signals/commands from the controller 110 in other embodiments. The vehicle operation modules can cause a change in the state of one or more vehicle actuators 102 and, in turn, the vehicle 100, in response to such control signals. The vehicle actuators 102 cause a change in physical operation of the vehicle 100, for example, accelerate, decelerate, turn, etc.

The vehicle controller 110 generates the control signals based on one or more inputs from one or more sensors 104 coupled with the vehicle 100. It is to be appreciated that the location of the sensors 104 relative to the vehicle 100, such as front, rear, or side, may be varied in one or more embodiments. The sensors 104 can include various types such as radar, lidar, image sensors, etc. One or more embodiments of the present technical solutions particularly use a color camera 112 and a scanning camera 114 from the sensors 104.

The color camera 112 and the scanning camera 114 are coupled to the vehicle 100 with a known alignment. The FOV of the color camera 112 and the scanning camera 114 are aligned with each other. For example, the FOVs are aligned at the center, at an edge, etc. even if the sizes of the FOVs are not the same.

Figure 2:
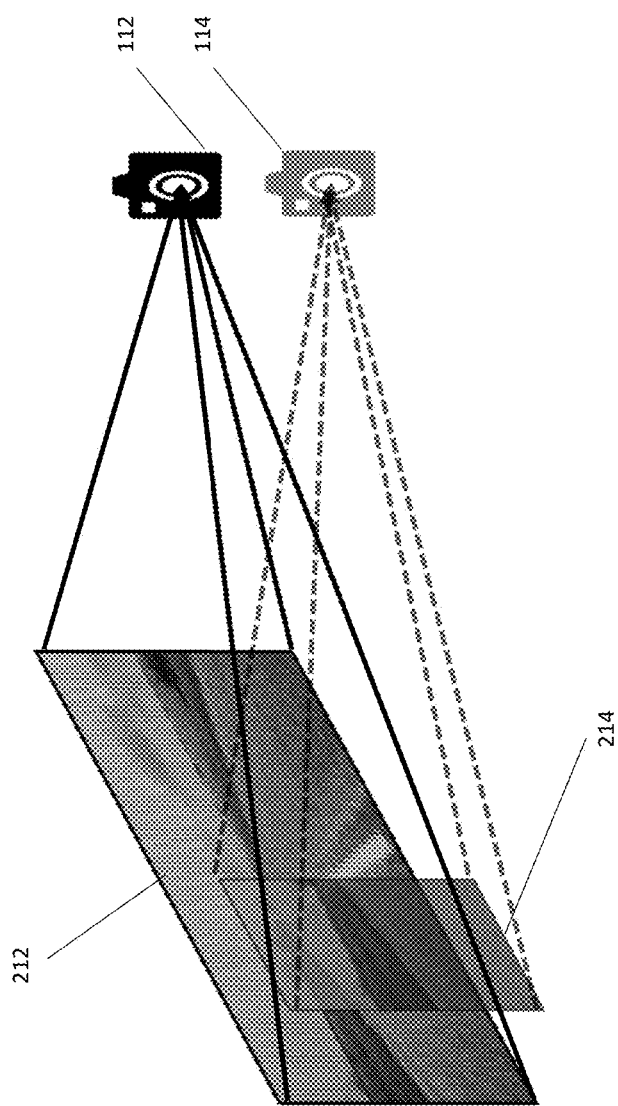
FIG. 2 depicts example images captured by the sensors according to one or more embodiments.

FIG. 2 depicts example images captured by the sensors according to one or more embodiments. The color camera 112 captures a color image 212 at a first resolution, with a first FOV. The scanning camera 114 captures multiple (N) grayscale images 214 that all overlap with the color image 212. It should be noted that only one of the N grayscale images 214 is shown in FIG. 2. The grayscale images 214 are captured at a second resolution and a second FOV, where the second resolution is higher than the first resolution, and the second FOV is narrower than the first FOV of the color camera 112.

Image resolution refers to how much detail is portrayed in an image. A higher resolution represents a greater detail being captured. For example, a 12-megapixel (MP) image provides substantially more detail than a 2-MP image. One MP is one million pixels, so each 16 MP image includes 16 million pixels, whereas a 2 MP image only contains 2 million pixels of detail data. Typically, the resolution is represented as 'Width×Height,' where Width=number of pixels in each row, and Height=number of pixels in each column.

In the case of sensors 104, the color images 212 are captured at a lower resolution, such as 2 MP, 5 MP, etc., while the grayscale images are captured at a relatively higher resolution, such as 8 MP, 12 MP, etc. It is understood that the other resolutions can be used in different embodiments, as long as the first resolution of the color image 212 is less than the second resolution of the grayscale image(s) 214.

FOV (Field of View) refers to the solid angle of the scene opposite the camera lens. It should be noted that in the description of embodiments herein, "FOV" represents a horizontal FOV of the color camera 112 and the scanning camera 114, and the vertical FOVs of the two cameras are considered to be substantially equal. However, it will be obvious to a person skilled in the art that the technical solutions described herein can be applied to cases where the vertical FOVs are also considered, either in addition to the horizontal FOVs or in place of the horizontal FOVs. In another example, the scanning camera 114 can sequentially scan in both directions, horizontal and vertical.

In the case of the sensors 104, the color images 212 are captured at a wider first FOV, such as 120°, 135°, etc., while the grayscale images 214 are captured at a narrower second FOV, such as 15°, 20°, etc. It is understood that other FOVs can be used in different embodiments, as long as the first FOV of the color image 212 is larger than the second FOV of the grayscale image(s) 214.

In other words, consider that the color image 212 is of dimensions W1×H1, with a resolution of R1 MP, and each of the grayscale images 214 is of dimensions W2×H1, with a resolution of R2 MP, W representing width and H representing height, then W2<W1, R1<R2, and multiple grayscale images 214 together cover the scene captured in the W1×H1 color image 212. In one or more embodiments, W1 W2*N, where N is the number of grayscale images 214. The grayscale images 214 are also referred to as "sub-images" of the color image 212 because the multiple grayscale images 214 cover the entire first FOV of the color image 212.

The controller 110 facilitates using the color image 212, with the wider FOV color camera 112 to improve the tracking of object-motion through the FOV of the scanning camera 114. Image distortions introduced by the scanning camera 114 are reduced or removed from reference images generated by the fixed FOV color image 212 from the color camera 112.

Figure 3:
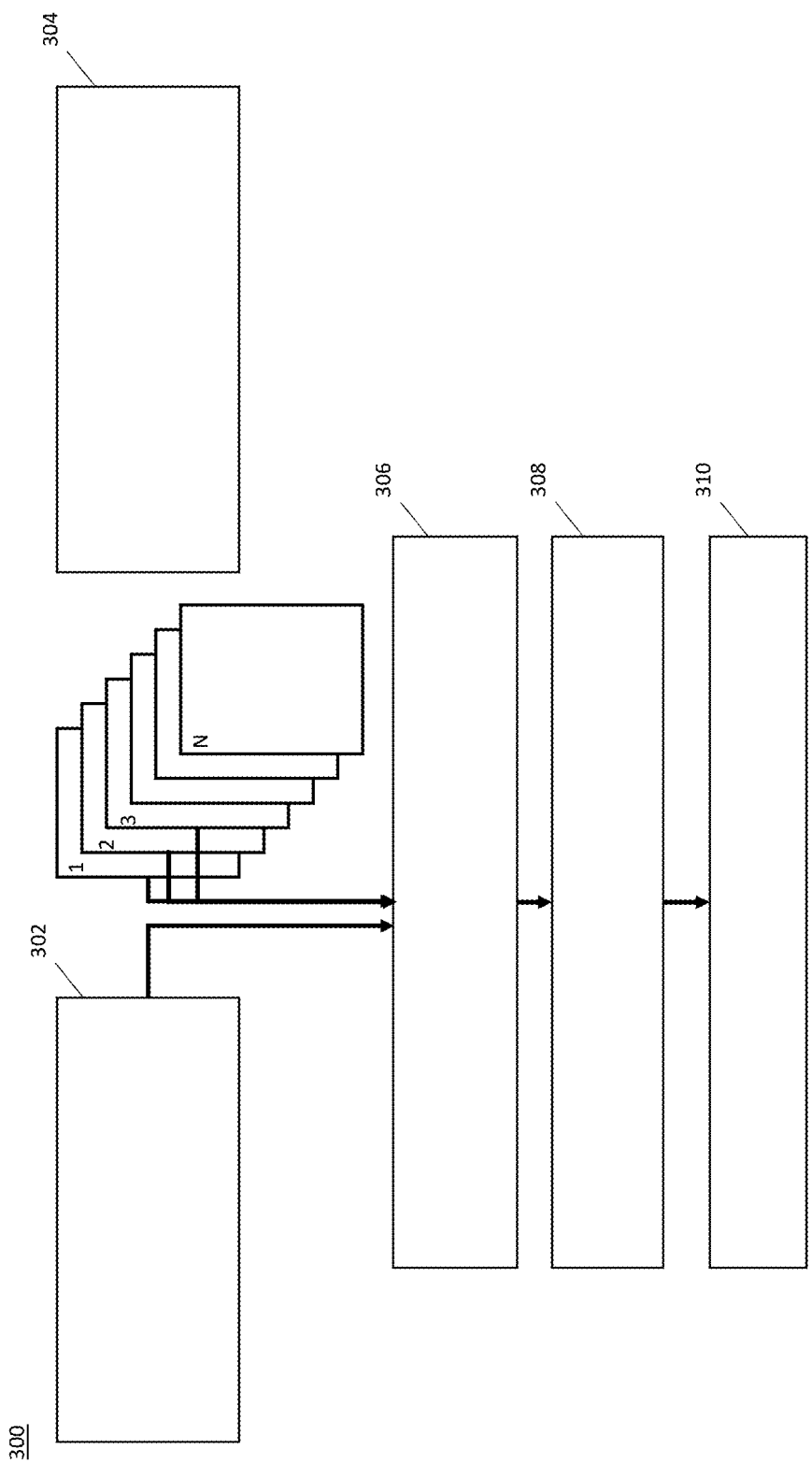
FIG. 3 depicts a flowchart of a method for combining multiple grayscale sub-images with a color image to create a high-resolution overlay image according to one or more embodiments.

FIG. 3 depicts a flowchart of a method for combining multiple grayscale sub-images with a color image to create a high-resolution overlay image according to one or more embodiments. The method 300 includes capturing, by the color camera 112, the color image 212 with the first (lower) resolution and the first (wider) FOV, at block 302. The method 300 also includes capturing, by the scanning camera 114, the multiple grayscale sub-images 214 with the second (higher) resolution and the second (narrower) FOV, at block 304. The color image 212 and the grayscale sub-images 214 are captured concurrently in one or more embodiments. The multiple grayscale sub-images can be N, where N is an integer, and where the N sub-images 214 cover the entire first FOV of the color image 212.

Figure 4:
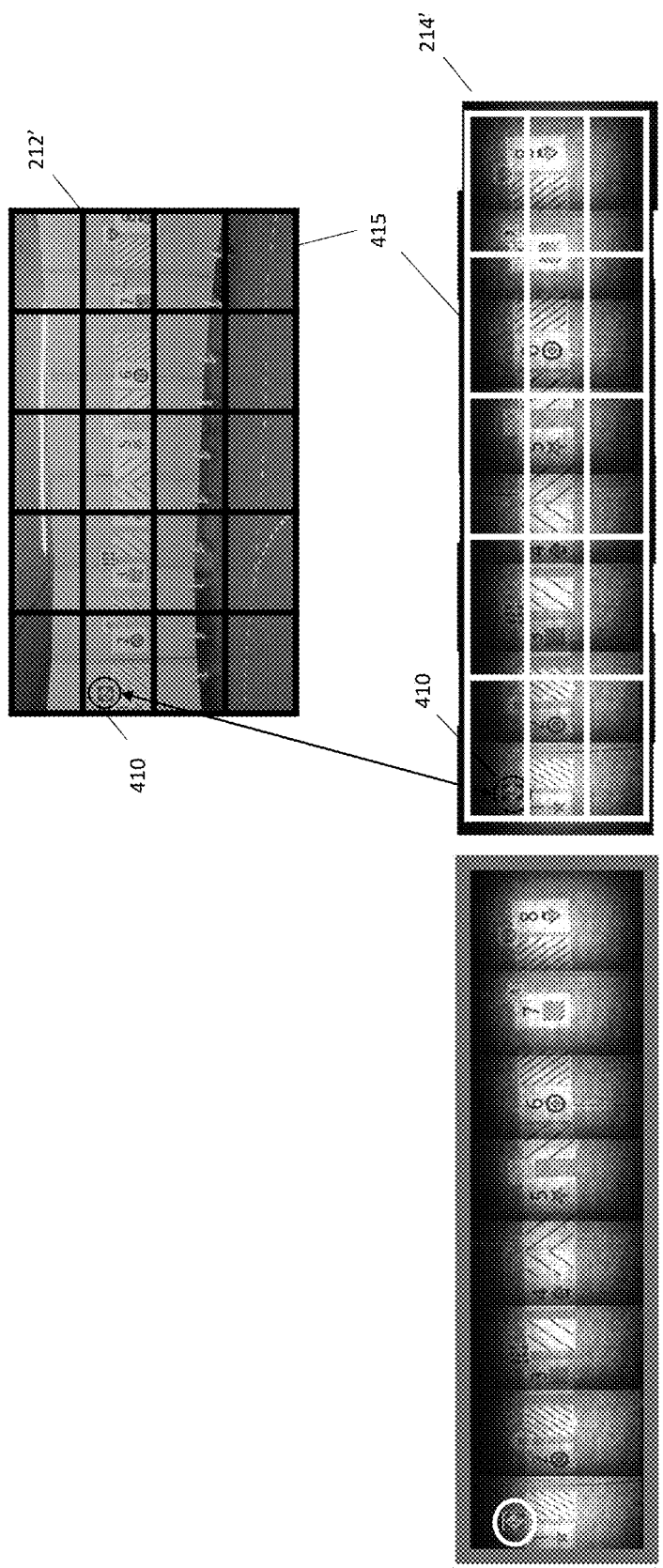
FIG. 4 depicts an example scenario of operating of one or more embodiments.

FIG. 4 depicts an example scenario where a color image 212' is obtained using the color camera 112 to capture a FOV, and multiple grayscale sub-images 214' are obtained from the scanning camera 114 to capture the same FOV using the N separate sub-images 214'.

Referring to the flowchart of method 300, a location of each of the sub-images 214 is correlated to the color image 212 using overlay mapping, at block 306. The correlation is determined by registering the color image 212 with the grayscale sub-images 214. The registration can be performed using one or more image-registration algorithms, which can be intensity-based, feature-based, or may use any other technique(s).

The example in FIG. 4 depicts a common feature 410 from the color image 212' and the sub-images 214'. The registration is performed using such recognized common features (410) in the wider color image 212 with the narrower grayscale sub-images 214. For example, the common features 410 are used to align, superimpose, or overlay one region of the corresponding images 212, 214 upon one another. The features 410 can be determined using one or more feature extraction algorithms such as edge detection, corner detection, blob detection, ridge detection, or any other such feature extraction techniques. Alternatively, or in addition, features 410 can be determined using object detection algorithms to identify specific objects that are typically observed in the case of vehicle 100, such as traffic lights, traffic signs, trees, other vehicles, pedestrians, billboards, lane markers, or any other such objects that the vehicle 100 can encounter.

In an example, the alignment and registration of the image 212 with the sub-images 214 can include generating a grid-map 415 that overlays the color image 212, and identifying one or more regions from the various sub-images 214 that align with each grid-block from the grid-map 415.

Again, referring to the flowchart in FIG. 3, at block 308, the method 300 further includes correcting motion distortions of the objects/features detected in the sub-images 214 using the color image 212. The distortion correction can be performed based on the alignment of the sub-images 214 with the color image 212. In one or more embodiments, the grid-map 415 can be used to correct the motion distortion(s). The motion distortion can be experienced because the scanning camera 114 captures the FOV across separate multiple sub-images 214 over a predetermined duration, while the color camera 112 captures substantially the same FOV as a single snapshot. Hence, an object such as another vehicle, or a tree, can be captured at different positions across the sub-images 214 because of the motion of the vehicle 100, or a motion of the object being captured. The distortion is corrected by using the position of the feature 410 in the color image 212 as a reference and selecting the one or more regions from the sub-images 214 that have the same feature 410 at substantially the same position as the corresponding regions.

Further, at block 310, the objects that are detected in the grayscale sub-images 214, and that are corrected of the distortion, are applied color based on the color camera image 212. The missing color information is completed by training and using an artificial neural network, such as a color super-resolution deep neural network. In one or more embodiments, it has been found that the resolution enhancement is substantially higher than for existing techniques such as chroma subsampling (which is ×2 in both dimensions). The artificial neural network used for applying color information can be supervised or self-supervised.

Figure 5:
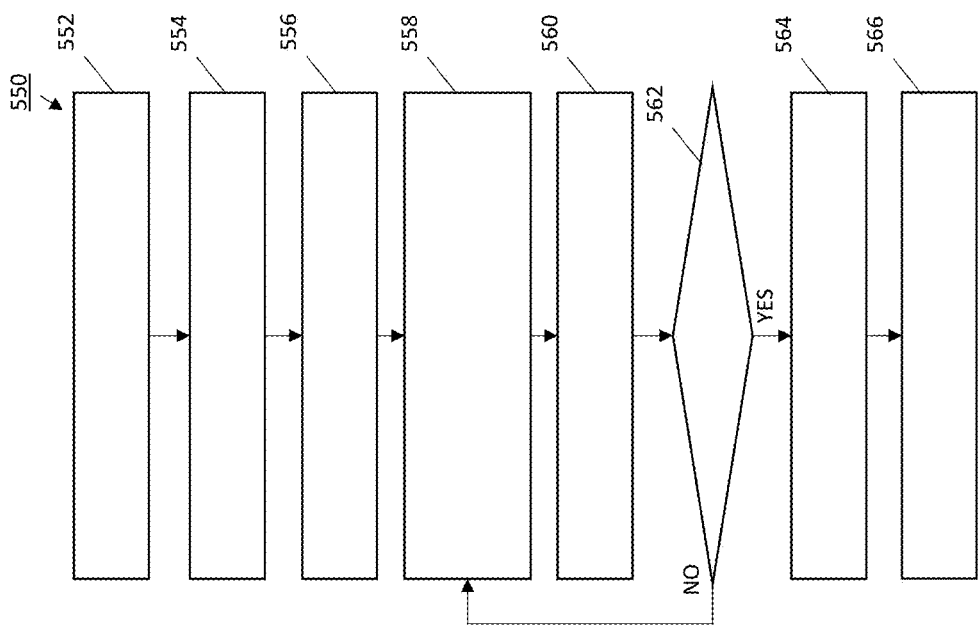
FIG. 5 depicts a block diagram of an artificial neural network for supervised coloration of objects in the sub-images according to one or more embodiments.
Figure 5:
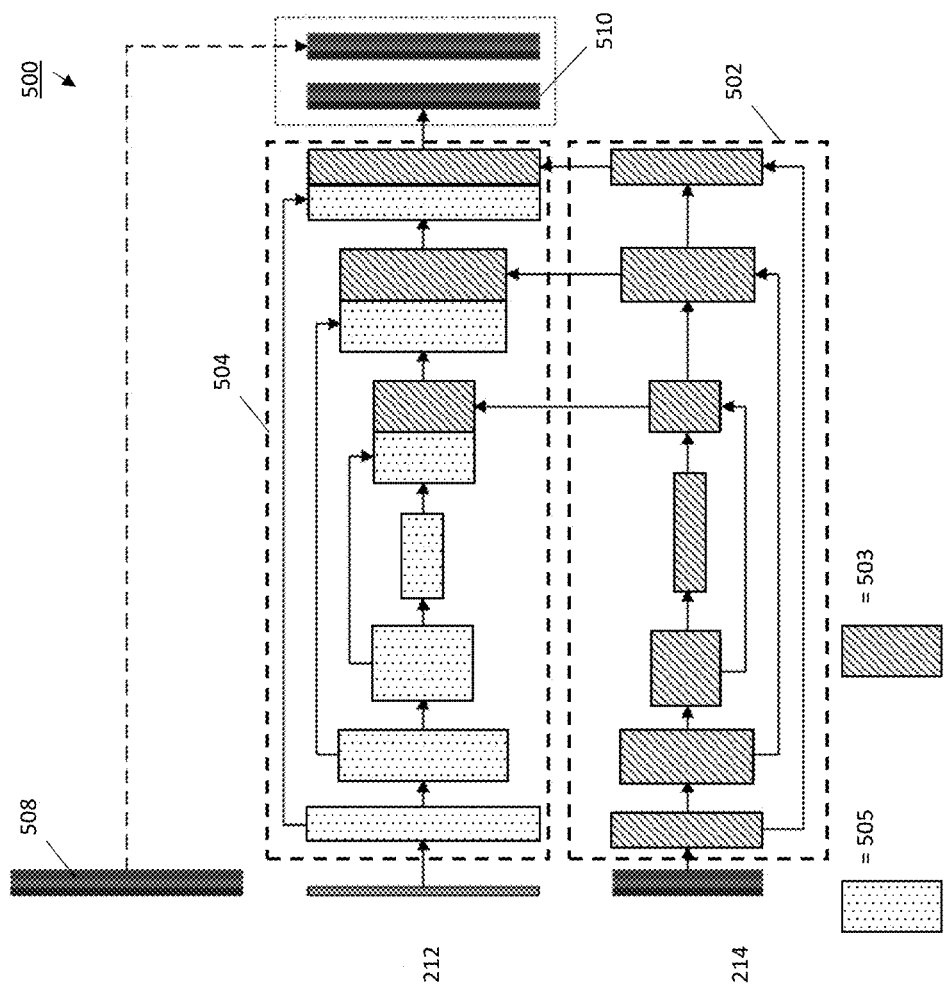

FIG. 5 depicts a block diagram of an artificial neural network 500 for supervised coloration of objects in the sub-images according to one or more embodiments. FIG. 5 also depicts a flowchart of a method 550 to train the artificial neural network 500.

The method 550 includes receiving the high-resolution sub-images 214 as input and detecting one or more objects or features 410 in the sub-images 214, at block 552. The method 550 further includes receiving the corresponding low-resolution color image 212 as input and detecting one or more objects or features 410 in the color image 212, at block 554. The sub-images 214 and the color image capture substantially the same FOV. The one or more objects or features 410 in the sub-images 214 and the color image 212 are detected by the controller 110 in one or more embodiments. Alternatively, an image processing module, such as a graphics processing unit, a digital signal processor, or any other co-processor (not shown), is used by the controller 110 to perform the object detection.

The common features 410 in the color image 212 and the grayscale sub-images 214 are used to align, superimpose, or overlay one region upon the other, at block 556. For example, the grid-map 415 is generated, and the regions, including the common features 410 are aligned and superimposed with each other. In one or more embodiments, regions from multiple sub-images 214 are mapped with a single region from the color image 212.

In one or more embodiments, the entirety of each of the sub-images 214 is transformed for the alignment with the color image 212. Alternatively, in one or more embodiments, only a subset of regions from the sub-images 214 are transformed to align with corresponding regions in the color image 212. For example, a first region is determined in a first sub-image 214 that is corresponding to a second region in the color image 212. The first region is transformed to align with the second region. The remaining regions of the first sub-image 214 are not transformed in this case. Rather, another region from the first sub-image 214 can be transformed in a different manner to align with a corresponding region of the color image 212. In one or more embodiments, the regions that are extracted and aligned in this manner can be based on objects detected in the images 212, 214. For example, if a particular object is detected in both the first sub-image 214 and the color image, the regions (i.e., the pixels representing the particular object) from the images 212, 214, are aligned. It should be noted that while the examples herein describe the sub-images 214 and/or the regions of the sub-images 214 being transformed to align with the color image 212, in other examples, the color image 212 and/or regions of the color image 212 are transformed to align with the corresponding sub-images 214.

The pixels corresponding to the detected objects in the high-resolution sub-images 214 are applied a color value based on the alignment with the color image 212, at block 558. The colorizing is performed using the neural network 500. The neural network 500 facilitates colorizing the high-resolution grayscale sub-images 214 using the low-resolution color image 212. In one or more embodiments, the input to the neural network 500 includes the sub-images 214 and the color image 212 that are aligned. Alternatively, the input to the neural network 500 includes only those regions of the sub-images 214 and of the color image 212 that are aligned with each other.

In one or more embodiments, the controller 110 includes a neural network controller (not shown) that implements the neural network 500. Alternatively, the controller 110 implements the neural network 500.

In one or more embodiments, the neural network 500 uses an encoder-decoder architecture. The neural network 500 is trained as a supervised artificial neural network. The neural network 500 includes a first neural network 502 and a second neural network 504. Each of the neural networks 502, 504, include multiple layers 503, 505, respectively. The layers can include fully connected layers, convolution layers, deconvolution layers, recurrent layers, encoders, decoders, or any other types of layers. It should be noted that the drawings of the neural networks are representative and that in one or more embodiments, the number of layers of the neural networks can be different than those depicted.

The neural network 500 determines the color value for a pixel in the sub-images 214 based on the corresponding pixel from the color image 212 and one or more neighborhood pixels from the color image 212. An output image 510 is generated for the FOV that includes high-resolution pixels from the sub-images 214 with color values assigned based on the color image 212.

In one or more embodiments, the color value for the pixel is determined by the first neural network 502 using a first intermediate data that is generated by the layers 503 and a second intermediate data from the layers 505 of the second neural network 504.

In the case where the encoder-decoder architecture is used, the decoder portion of the first neural network 502 shares information with the decoder portion of the second neural network 504. The layers 503 of the first neural network 502 generate the first intermediate data based on the grayscale sub-images 214, while the layers 505 of the second neural network 504 generate the second intermediate data using the color image 212. The second intermediate data from the layers 505 is input to the one or more corresponding layers 503. The second intermediate data is upscaled by the layers 503. The upscaling is performed to match the resolution of the input data used by the two neural networks 502, 504. The corresponding layers can be the same sequential layers in the two neural networks 502, 504, for example, fifth layers in the two neural networks 502, 504. Alternatively, or in addition, the corresponding layers of the two neural networks 502, 504, are layers that perform the same function but may not be sequentially the same, for example, the fifth layer from the first neural network 502, and the seventh layer from the second neural network 504.

At block 560, during training, the generated output image is compared with a high-resolution reference image 508. The high-resolution reference image 508 is a predetermined image of the FOV that is captured by the color camera 112 and the scanning camera 114. Alternatively, the reference image 508 is generated using another camera that can generate high-resolution color images. If the error (i.e., difference) between the high-resolution reference image 508 and the generated output image 510 is below a predetermined threshold, the neural network 500, including the first neural network 502 and the second neural network 504, is deemed to be trained, at blocks 562, 564. If the threshold is not satisfied, at block 562, the above-described operations to generate the output image 510 are repeated with different weight values, (i.e., parameters, of the neural networks 502, 504). This process is repeated iteratively with different parameters of the neural networks 502, 504, until the output image 510 substantially matches the reference image 508.

It is understood that the iterative training can be performed multiple times for several high-resolution reference images 508 in a training dataset. The neural networks 502, 504, are accordingly trained by determining the parameters that generate the expected output image(s) 510 using a low-resolution camera image 212 and the multiple high-resolution grayscale sub-images 214.

The trained neural network 500 is used to generate the output images 510 in real-time, at block 564. Such a real-time use includes receiving the multiple sub-images 214 and the corresponding color image 212 with features detected and aligned and generating the colorized high-resolution output image 510 (no comparison with reference image). In one or more embodiments, the neural networks 502, 504 are trained using entire images 212, 214; however, during runtime (i.e., after training is completed), the output image 510 is generated by the neural networks 502, 504, using only a subset of the regions of the images 212, 214 that are aligned. For example, this can be the case where the images 212, 214 that are used during training are captured using predetermined settings that are conducive for all of the regions, i.e., the entirety of the images 212, 214 to be aligned. Whereas, because of the uncertainty in conditions during the runtime of the vehicle 100, only a subset of the regions of the images 212, 214 may be transformed during the alignment. In such cases, only those regions that can be aligned are used for generating the output image 510.

The generated output images 510 are used by the controller 110 to perform one or more ADAS functions, at block 566. The ADAS functions can include generating and sending one or more control signals/commands to the vehicle actuators 102, as described herein.

Figure 6:
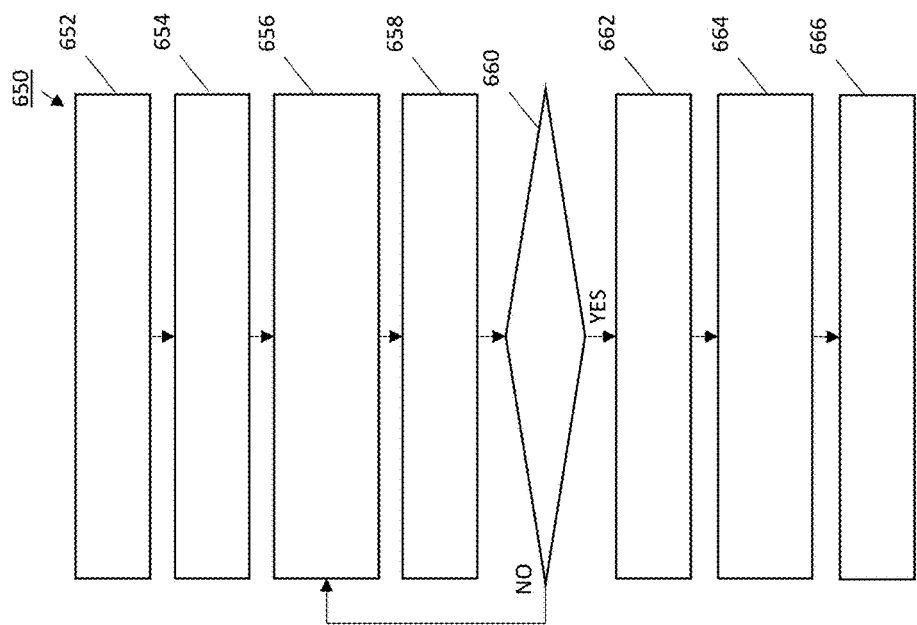
FIG. 6 depicts a block diagram of an artificial neural network for supervised coloration of objects in the sub-images according to one or more embodiments.
Figure 6:
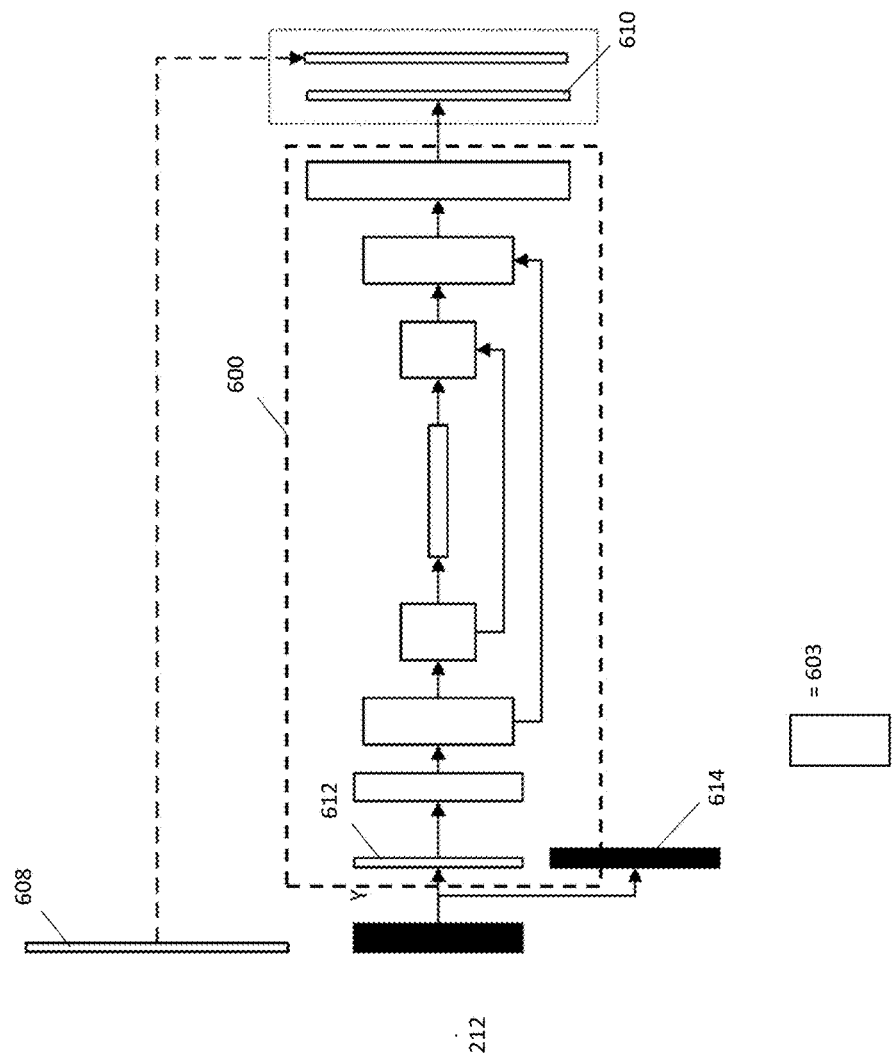

FIG. 6 depicts a block diagram of an artificial neural network 600 for supervised coloration of objects in the sub-images according to one or more embodiments. FIG. 6 also depicts a flowchart of a method 650 to train the artificial neural network 600.

The method 650 includes receiving the low-resolution color image 212 as input, at block 652. The color image 212 is represented using the YCbCr coloring model, where Y represents luminance, Cb represents a difference blue-difference, and Cr represents the red-difference chroma components to represent a color value of the pixels in the color image 212.

In one or more embodiments, the color image 212 is converted to use the YCbCr coloring model. For example, the conversion can include changing the coloring model of the color image 212 from RGB (red, green, blue) to the YCbCr coloring model. Alternatively, the color image 212 can be converted from a CMY (cyan, magenta, yellow) coloring model to the YCbCr coloring model. Any other conversion is possible in other embodiments.

The method 650 includes separating the Y values 612, and the chroma values 614 of the color image 212, at block 654. Further, the neural network 600 is used to generate a high-resolution color image as an output image 610. In one or more embodiments, the neural network 500 uses an encoder-decoder architecture. The artificial neural network 600 is trained as a self-supervised artificial neural network. The artificial neural network 600 includes multiple layers 603. The layers 603 can include fully connected layers, convolution layers, deconvolution layers, recurrent layers, encoders, decoders, or any other types of layers. It should be noted that the drawing of the neural network is representative and that in one or more embodiments, the number of layers of the neural network can be different than those depicted.

In one or more embodiments, the Y values 612 are used by the layers 603 of the neural network 600 to generate a high-resolution grayscale output image 610, at block 656. The high-resolution output image 610 is generated to have a predetermined resolution matching that of a sub-image 214. In one or more embodiments, the high-resolution output image 610 has the dimensions of the color image 212, with a pixel density of the scanning camera 114. The high-resolution output image 610 is a grayscale image that only has luminance values (i.e., black-gray-white values). The luminance (i.e., grayscale value for a pixel in the output image 610) can be determined based on the Y values of the one or more neighborhood pixels from the color image 212. Accordingly, the neural network 600 generates a grayscale output image 610.

At block 658, during training, the generated output image 610 is compared with a high-resolution reference image 608. In one or more embodiments, the high-resolution reference image 608 is a predetermined image of the FOV that is captured by another high-resolution camera in grayscale, for example, using the scanning camera 114 with a wide-angle lens. In one or more embodiments, the reference image 608 is generated using the scanning camera 114 concurrently, while the low-resolution color image 212 is generated by the color camera 112.

If the error (i.e., difference) between the high-resolution reference image 608 and the generated output image 610 is below a predetermined threshold, the neural network 600 is deemed to be trained, at blocks 660, 662. If the threshold is not satisfied, at block 660, the above-described operations to generate the output image are repeated with different weight values (i.e., parameters, of the neural networks 600). This process is repeated iteratively with different parameters of the neural network 600 until the output image 610 matches the reference image 608.

It is understood that the iterative training can be performed multiple times for several high-resolution reference images 608 in a training dataset. The neural network 600 is accordingly trained by determining the parameters that generate the expected output image(s) using a low-resolution camera image 212.

Further, the neural network 600 is used to upscale color (Cb/Cr) information from the color image 212 to assign color values to the pixels of the high-resolution output image 610, at block 664.

The trained neural network 600 is used to generate the output images 610 in real-time, at blocks 662, 664. The generated output images 610 are used by the controller 110 to perform one or more ADAS functions, at block 666. The ADAS functions can include generating and sending one or more control signals/commands to the vehicle actuators 102, as described herein.

Technical solutions described herein facilitate overlaying a color image from a low-resolution wide FOV camera on a high-resolution grayscale image generated by a scanning imaging system. The combination of images is analyzed to improve tracking the motion of an object in the FOV captured in the grayscale image(s) by using the color image. Image distortions introduced by the scanning imaging system can be reduced or removed using the color images generated by the fixed FOV color image. The technical solutions described herein provide machine learning techniques, including neural networks, for implementing various features.

The neural networks can be trained using supervised training or self-supervised training algorithms.

The technical solutions facilitate practical application to improve the performance of ADAS systems in vehicles by reducing the cost of capturing high-resolution, wide FOV images to implement one or more applications of the ADAS.

Figure 7:
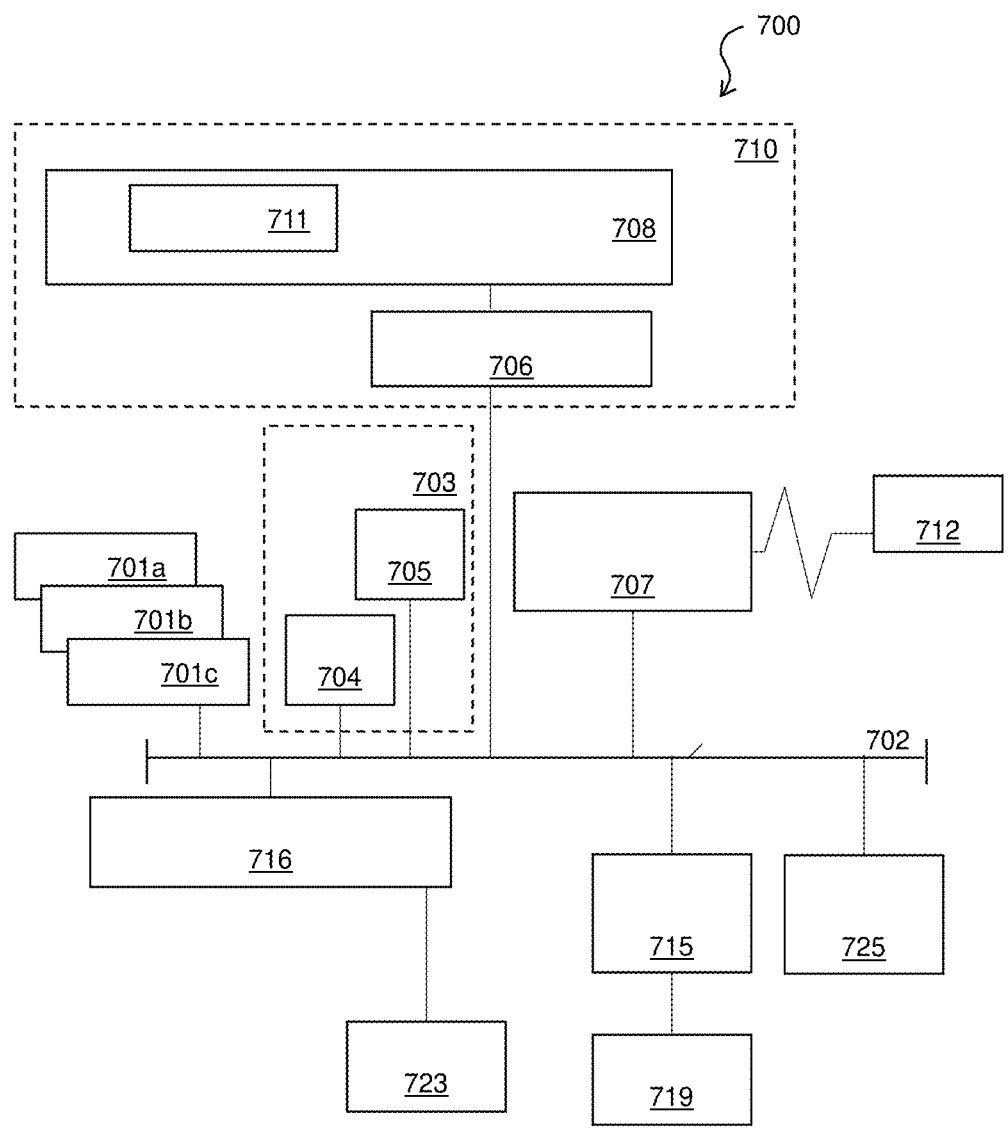
FIG. 7 is a block diagram of a computer system in accordance with an embodiment.

Turning now to FIG. 7, a computer system 700 is generally shown in accordance with an embodiment. The computer system 700 can be an electronic computer framework comprising and/or employing any number and combination of computing devices and networks utilizing various communication technologies, as described herein. The computer system 700 can be easily scalable, extensible, and modular, with the ability to change to different services or reconfigure some features independently of others. The computer system 700 may be, for example, a server, desktop computer, laptop computer, tablet computer, or smartphone. In some examples, computer system 700 may be a cloud computing node. Computer system 700 may be described in the general context of computer system executable instructions, such as program modules, being executed by a computer system. Generally, program modules may include routines, programs, objects, components, logic, data structures, and so on that perform particular tasks or implement particular abstract data types. Computer system 700 may be practiced in distributed cloud computing environments where tasks are performed by remote processing devices that are linked through a communications network. In a distributed cloud computing environment, program modules may be located in both local and remote computer system storage media, including memory storage devices.

As shown in FIG. 7, the computer system 700 has one or more central processing units (CPU(s)) 701a, 701b, 701c, etc. (collectively or generically referred to as processor(s) 701). The processors 701 can be a single-core processor, multi-core processor, computing cluster, or any number of other configurations. The processors 701, also referred to as processing circuits, are coupled via a system bus 702 to a system memory 703 and various other components. The system memory 703 can include a read-only memory (ROM) 704 and a random access memory (RAM) 705.

The ROM 704 is coupled to the system bus 702 and may include a basic input/output system (BIOS), which controls certain basic functions of the computer system 700. The RAM is read-write memory coupled to the system bus 702 for use by the processors 701. The system memory 703 provides temporary memory space for operations of said instructions during operation. The system memory 703 can include random access memory (RAM), read-only memory, flash memory, or any other suitable memory systems.

The computer system 700 comprises a co-processor 725 that the processors 701 can use to perform one or more operations. The co-processor 725 can include a graphics processing unit, a digital signal processor, a neural network controller, a model-based controller, and/or any other type of processing unit or a combination thereof.

The computer system 700 comprises an input/output (I/O) adapter 706 and a communications adapter 707 coupled to the system bus 702. The I/O adapter 706 may be a small computer system interface (SCSI) adapter that communicates with a hard disk 708 and/or any other similar component. The I/O adapter 706 and the hard disk 708 are collectively referred to herein as a mass storage 710.

Software 711 for execution on the computer system 700 may be stored in the mass storage 710. The mass storage 710 is an example of a tangible storage medium readable by the processors 701, where the software 711 is stored as instructions for execution by the processors 701 to cause the computer system 700 to operate, such as is described herein with respect to the various Figures. Examples of computer program product and the execution of such instruction is discussed herein in more detail. The communications adapter 707 interconnects the system bus 702 with a network 712, which may be an outside network, enabling the computer system 700 to communicate with other such systems. In one embodiment, a portion of the system memory 703 and the mass storage 710 collectively store an operating system, which may be any appropriate operating system to coordinate the functions of the various components shown in FIG. 7.

Additional input/output devices are shown as connected to the system bus 702 via a display adapter 715 and an interface adapter 716. In one embodiment, the adapters 706, 707, 715, and 716 may be connected to one or more I/O buses that are connected to the system bus 702 via an intermediate bus bridge (not shown). A display 719 (e.g., a screen or a display monitor) is connected to the system bus 702 by a display adapter 715, which may include a graphics controller to improve the performance of graphics-intensive applications and a video controller. A keyboard, a mouse, a touchscreen, one or more buttons, a speaker, etc., can be interconnected to the system bus 702 via the interface adapter 716, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 7, the computer system 700 includes processing capability in the form of the processors 701, and, storage capability including the system memory 703 and the mass storage 710, input means such as the buttons, touchscreen, and output capability including a speaker 723 and the display 719.

In some embodiments, the communications adapter 707 can transmit data using any suitable interface or protocol, such as the internet small computer system interface, among others. The network 712 may be a cellular network, a radio network, a wide area network (WAN), a local area network (LAN), or the Internet, among others. An external computing device may connect to the computer system 700 through the network 712. In some examples, an external computing device may be an external web server or a cloud computing node.

It is to be understood that the block diagram of FIG. 7 is not intended to indicate that the computer system 700 is to include all of the components shown in FIG. 7. Rather, the computer system 700 can include any appropriate fewer or additional components not illustrated in FIG. 7 (e.g., additional memory components, embedded controllers, modules, additional network interfaces, etc.). Further, the embodiments described herein with respect to computer system 700 may be implemented with any appropriate logic, wherein the logic, as referred to herein, can include any suitable hardware (e.g., a processor, an embedded controller, or an application-specific integrated circuit, among others), software (e.g., an application, among others), firmware, or any suitable combination of hardware, software, and firmware, in various embodiments.

Embodiments of the technical solutions described herein facilitate algorithmically combining grayscale images with higher resolution and narrower FOV, which are captured from a scanning camera with the lower resolution and wider FOV images of a color camera. The color camera is static (i.e., has a fixed FOV) while the scanning camera is used to capture multiple images with the narrower FOV but capture (or overlap) the entire FOV of the color camera. The resulting image from the combination is a combined image in color, high-resolution wide FOV, with low distortion. The resulting image can be used for various AV/ADAS applications. Embodiments of the technical solutions described herein, by using such a combination, facilitate a low cost, high resolution, wide FOV camera.

Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

It should be understood that one or more steps within a method or process may be executed in a different order (or concurrently) without altering the principles of the present disclosure. Further, although each of the embodiments is described above as having certain features, any one or more of those features described with respect to an embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed but will include all embodiments falling within the scope thereof

What is claimed is:

1. A vehicle control system for automated driver-assistance, the vehicle control system comprising:
    a low-resolution color camera that captures a color image of a field of view at a first resolution;
    a high-resolution scanning camera that captures a plurality of grayscale images, each of the grayscale images at a second resolution, wherein the second resolution is higher than the first resolution, and the plurality of grayscale images encompass the same field of view as the color image; and
    one or more processors that perform a method that comprises:
        overlaying the plurality of grayscale images over the color image;
        correcting motion distortion of one or more objects detected in the grayscale images; and
        generating a high-resolution output image by assigning color values to one or more pixels in the grayscale images based on the color image using a trained neural network.

2. The vehicle control system of claim 1, wherein the trained neural network is trained using supervised training using a reference high-resolution color image.

3. The vehicle control system of claim 1, wherein the trained neural network comprises:
    a first neural network that generates a first set of color values based on the color image; and
    a second neural network that generates a second set of color values based on the grayscale images, and further, generates the high-resolution output image with pixels based on the first set of color values and the second set of color values.

4. The vehicle control system of claim 3, wherein output from one or more layers of the first neural network is provided to corresponding layers of the second neural network for determining the color values.

5. The vehicle control system of claim 1, wherein the trained neural network is trained using self-supervised training.

6. The vehicle control system of claim 5, wherein the trained neural network is trained to generate the high-resolution output image by transforming one or more regions of the color image with the first resolution to match corresponding regions in the grayscale images with the second resolution.

7. The vehicle control system of claim 6, wherein the trained neural network is further trained to determine the color values for pixels in the high-resolution output image by upscaling color values of pixels in the color image with a lower resolution.

8. A computer-implemented method for automated driver-assistance by a vehicle control system, wherein the computer-implemented method comprises:
    capturing, by a low-resolution color camera, a color image of a field of view at a first resolution;
    capturing, by a high-resolution scanning camera, a plurality of grayscale images, each of the grayscale images is of a second resolution, wherein the second resolution is higher than the first resolution, and the plurality of grayscale images encompass the same field of view as the color image; and
    generating a high-resolution output image, by one or more processors by performing a method that comprises:
        overlaying the plurality of grayscale images over the color image;
        correcting motion distortion of one or more objects detected in the grayscale images; and
        generating the high-resolution output image by assigning color values to one or more pixels in the grayscale images based on the color image using a trained neural network.

9. The method of claim 8, wherein the trained neural network is trained using supervised training using a reference high-resolution color image.

10. The method of claim 8, wherein the trained neural network comprises:
    a first neural network that generates a first set of color values based on the color image; and
    a second neural network that generates the high-resolution output image with pixels based on the first set of color values from the first neural network and one or more features from the grayscale images.

11. The method of claim 10, wherein output from one or more layers of the first neural network is provided to corresponding layers of the second neural network for determining the color values.

12. The method of claim 8, wherein the trained neural network is trained using self-supervised training.

13. The method of claim 12, wherein the trained neural network is trained to generate the high-resolution output image by transforming one or more regions of the color image with the first resolution to match corresponding regions in the grayscale images with the second resolution.

14. The method of claim 13, wherein the trained neural network is further trained to determine the color values for pixels in the high-resolution output image by upscaling color values of pixels in the color image with a lower resolution.

15. A computer program product comprising non-transitory computer-readable media comprising computer-executable instructions, which when executed by one or more processors cause the one or more processors to perform a method comprising:
- capturing, by a low-resolution color camera, a color image of a field of view at a first resolution;
- capturing, by a high-resolution scanning camera, a plurality of grayscale images, each of the grayscale images is of a second resolution, wherein the second resolution is higher than the first resolution, and the plurality of grayscale images encompass the same field of view as the color image; and
- generating a high-resolution output image by performing a method that comprises:
  - overlaying the plurality of grayscale images over the color image;
  - correcting motion distortion of one or more objects detected in the grayscale images; and
  - generating the high-resolution output image by assigning color values to one or more pixels in the grayscale images based on the color image using a trained neural network.

16. The computer program product of claim 15, wherein the trained neural network is trained using supervised training using a reference high-resolution color image.

17. The computer program product of claim 15, wherein the trained neural network comprises:
- a first neural network that generates a first set of color values in the color image; and
- a second neural network that generates the high-resolution output image with pixels based on the first set of color values from the first neural network and one or more features from the grayscale images.

18. The computer program product of claim 17, wherein output from one or more layers of the first neural network is provided to corresponding layers of the second neural network for determining the color values.

19. The computer program product of claim 15, wherein the trained neural network is trained using self-supervised training.

20. The computer program product of claim 19, wherein the trained neural network is trained to:
- generate the high-resolution output image by transforming one or more regions of the color image with the first resolution to match corresponding regions in the grayscale images with the second resolution, and
- determine the color values for pixels in the high-resolution output image by upscaling the color values of pixels in the color image.

* * * * *